(12) United States Patent
Czaloun

(10) Patent No.: US 8,937,240 B2
(45) Date of Patent: Jan. 20, 2015

(54) CABLE INSTALLATION FOR PIVOTING A SUPPORT STRUCTURE FOR PHOTOVOLTAIC MODULES OR COMPARABLE DEVICES

(76) Inventor: Johann Czaloun, Meran (IT)

( * ) Notice: Subject to any disclaimer, the term of this patent is extended or adjusted under 35 U.S.C. 154(b) by 0 days.

(21) Appl. No.: 13/822,273

(22) PCT Filed: Sep. 2, 2011

(86) PCT No.: PCT/EP2011/065209
§ 371 (c)(1),
(2), (4) Date: Mar. 11, 2013

(87) PCT Pub. No.: WO2012/034873
PCT Pub. Date: Mar. 22, 2012

(65) Prior Publication Data
US 2013/0167912 A1    Jul. 4, 2013

(30) Foreign Application Priority Data
Sep. 13, 2010  (IT) .............. BZ2010A0034

(51) Int. Cl.
*F24J 2/40*   (2006.01)
*F24J 2/52*   (2006.01)
*H01L 31/048* (2014.01)
*H01L 31/042* (2014.01)
*F24J 2/54*   (2006.01)

(52) U.S. Cl.
CPC .............. *F24J 2/405* (2013.01); *F24J 2/5233* (2013.01); *F24J 2/5241* (2013.01); *F24J 2/5413* (2013.01); *H01L 31/0422* (2013.01); *H01L 31/048* (2013.01); *Y02E 10/52* (2013.01); *Y02E 10/47* (2013.01)
USPC ........................ 136/230; 136/244; 136/246

(58) Field of Classification Search
USPC ........... 136/245, 251, 230, 244, 246; 126/704
See application file for complete search history.

(56) References Cited

U.S. PATENT DOCUMENTS

| 4,585,318 | A | 4/1986 | Seifert |
| 7,380,549 | B1 * | 6/2008 | Ratliff ......................... 126/605 |
| 8,440,950 | B1 * | 5/2013 | Reischmann ............... 250/203.4 |
| 2008/0061277 | A1 * | 3/2008 | Grapes et al. ................. 254/352 |
| 2010/0018566 | A1 | 1/2010 | Jackson |

FOREIGN PATENT DOCUMENTS

DE   2005012612    * 11/2005
WO   WO-2010/054831 A2   5/2010

OTHER PUBLICATIONS

De2005012612—English equivalent of the abstract.*
International Search Report received in PCT/EP2011/065209 dated Oct. 10, 2011.

* cited by examiner

*Primary Examiner* — Susan D Leong
(74) *Attorney, Agent, or Firm* — Foley & Lardner LLP

(57) ABSTRACT

A cable installation having a support structure, for example a rod or a support frame will be proposed, the latter or the former, being able to be hinged to abuses structure about a first axis, respectively, wherein at each end of the support structure a deviating roller is rotatably provided, which is provided for a cable which at one end is fixed to an area of the support structure while the other end of the cable is fixed to a second area of the base structure which is spaced apart from the first area.

9 Claims, 3 Drawing Sheets

CABLE INSTALLATION FOR PIVOTING A SUPPORT STRUCTURE FOR PHOTOVOLTAIC MODULES OR COMPARABLE DEVICES

BACKGROUND

Photovoltaic modules are partly mounted on support structures which follow the sun along one or two axes. The major advantage of this movable support structure known as "mover" over the tightly anchored ones is higher current efficiency with one and the same active module surface.

A very particular problem with larger surfaces which are installed outdoors resides, among others, in the wind forces which are also transferred to the adjusting means and which under unfavorable conditions which are to be considered will provoke excessive stresses in the latter.

Common adjusting means are mostly actuated by cylinders, gear segments, screws or equivalent elements the shared disadvantage thereof residing in the fact that torques caused by wind forces will be absorbed by way of relatively short lever-arms thus causing high forces in the adjusting means itself as well as in the anchoring sites.

Accordingly, an adjusting means is to be found the mesh points of which on the pivotable support structure are outwardly offset as far as possible, however, without oversized adjustment elements becoming necessary. One possibility would be by way of adjustment cables or comparable flexible traction elements which are mounted on the support structure to be pivoted. There are already known such systems which, however, suffer from the disadvantage of requiring circular segments which are concentrically connected to the pivoting axis and are connected to the support structure to be pivoted and whereon the adjustment cables will be wound on one side and accordingly will be unwound on the other side. Only with this kind of geometry it will be achieved that the cable length which is wound by the pivoting movement will be equal to that which is unwound in the case when the movement of the adjustment cable will be accomplished by a conventional continuous winch.

As mentioned above, due to static reasons, the mesh points of the adjustment cable must widely be spaced from each other. With the know solutions this distance corresponds to the diameter of simultaneously rotating circular segments, whereby such adjustment devices may take large dimensions. A further disadvantage of the conventional solutions wherein the adjustment cable is wound and unwound on circular segments, respectively, resides in that the winch must be mounted on the side which is turned away from the one having the circular segments in order to actuate the adjustment cable united on the pivoting part.

The publication US 2010/018566 describes a device for the transformation into a photovoltaic current including one or more balloons including gas which is lighter than air, with one or more solar energy panels on a basis, one or more solar energy panels which are mounted by one or more balloons, one or more balloons being mounted on one or more solar energy panels, wherein a weight is provided which, with one end, is mounted on one or more panels and which, with the second end, is mounted on a basis, wherein an electric charge tester is connected to a battery system for the adjustment of one or more energy panels; and a battery system for the electric charge.

The cable system described in this prepublication allows tracking panels on balloons as a support structure wherein length balancing of the cables is not required.

The European patent 0 114 240, on the other hand, shows tracking means for the precise or approximate tracking of devices according to an arcuate track, for example of solar technical receivers or reflectors, wherein movement of the device will be realized about two axes and movement of the device about the second axis is necessarily coupled to the movement around the first axis by way of at least one guiding element having a hinge point and the guiding element pivots about hinge point which, in relation to the major movement, is not simultaneously displaced and is located exterior of the first axis of the device, wherein the axes intersect and the guiding element is arranged such that the simultaneously moved hinge point moves at a circle point the center of which is the intersection of the axes and the connecting line between this intersection and the hinge point which is not displaced is exactly or approximately parallel to the axis of the earth or to the surface normal, respectively, of the track of the tracked object.

This tracking means is very complicated regarding to its execution and furthermore regarding to the support construction, due to the fact that bearing thereof on one of its axes may only be realized with expenditure and effort.

SUMMARY

The object of the present invention is to overcome the disadvantages of the conventional cable installations and to propose a simpler cable construction allowing spacing apart the gripping points of the cable ends as widely as possible.

This object will be achieved according to the invention by way of a cable installation according to the characterizing part of claim 1.

Furthermore a cable installation having a support structure, for example a rod or a support frame will be proposed, the latter or the former, being able to be hinged to a bases structure about a first axis, respectively, wherein at each end of the support structure a deviating roller is rotatably provided, which is provided for a cable which at one end is fixed to an area of the support structure while the other end of the cable is fixed to a second area of the base structure which is spaced apart from the first area, wherein, between the deviating rollers, the cable can be wound and unwound on a reel which is perpendicular to the first axis, wherein the cable can be wound and unwound with a coil diameter with respect to the reel axis, respectively.

In a preferred embodiment the drum comprises a body tapering toward the drum ends and having helical grooves accommodating the cable.

In one aspect the support structure is a rod or a supporting surface which is connected to the respective rod, wherein the pivoting movement is accomplished by a cable which is guided around the deviating rollers at the ends of the rod, is anchored at its ends to the anchoring sites and is moved by a winch which is mounted between the deviating rollers on the rotatable rod, wherein the ratio of the cable length which is wound and unwound, respectively, may be modified, the ratio corresponding, in each position, to the length variation in the range between the axis of one of the deviating rollers and the anchoring site of one of the ends of the cable or between the axis of the other deviating roller and the anchoring site of the other end of the cable, respectively.

In another embodiment the variable ratio between the cable branch which is wound and the cable branch which is unwound will be attained by a cable drum wherein the diameter of the helically arranged cable grooves will be adapted according to the geometrical conditions in each position. The cable may be continuously or multiply wound or may be divided close to the drum itself and may be clamped with each of its ends onto the latter.

In another embodiment of a continuous winch which realized by a cable drum a cable unwinding, preferably that in the center, is drawn off the cable drum by a spring-loaded tension roller, thus allowing compensation of variation in total length of the cable ring during the adjustment procedure, or the total cable system has a given pretension within defined limits.

Other characteristics and details of the cable installation according to invention will become apparent from the claims and the specification of a preferred embodiment as set forth in the figures and the accompanying drawing wherein

DETAILED DESCRIPTION OF FIGURES

Figure 1:
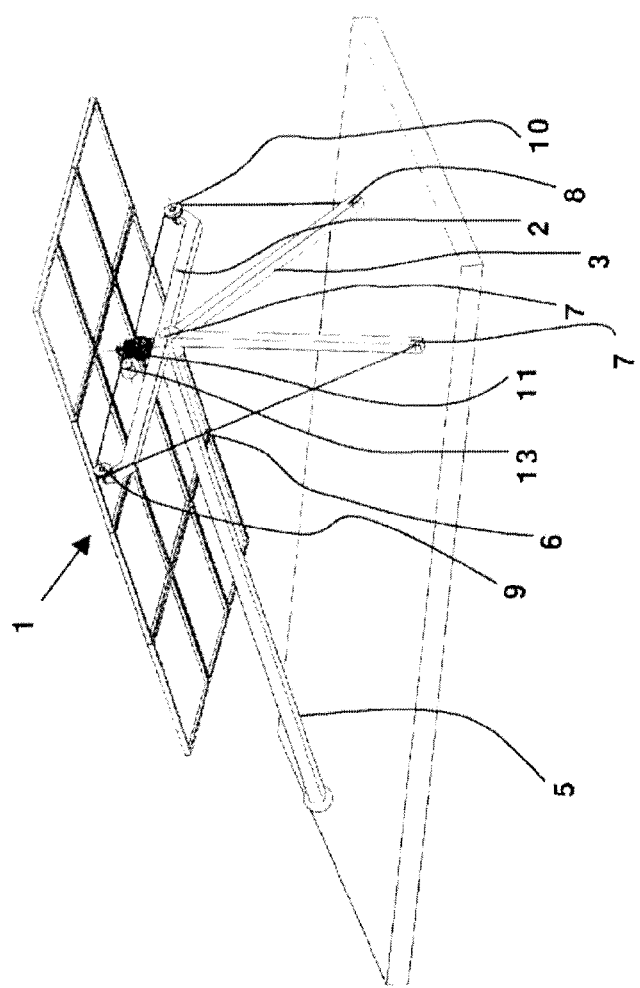
FIG. 1 schematically shows a perspective view of a supporting structure or a photovoltaic module.
Figure 2:
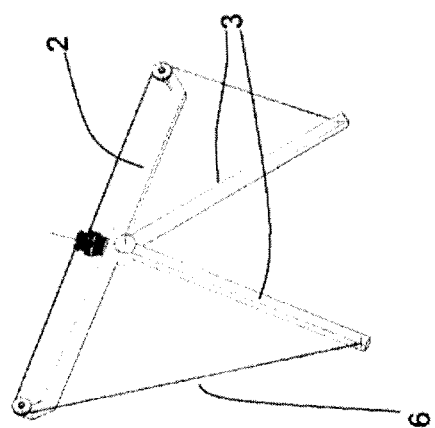
FIG. 2 shows a detail from FIG. 1.

Present invention relates to a cable installation for pivoting a support structure for photovoltaic modules or comparable devices such as solar heat concentrators or solar panels.

In the figure, by reference number 1, a photovoltaic module is shown in its entirety.

The photovoltaic module 1 is freely supported by a supporting structure in the form of a rod which itself is supported by a base structure in the form of a two-leg-structure 3 about an axis 4 and for stability reasons by a support 5.

The adjustment cable 6 is anchored in the area of both supporting sites 7 and 8 of the two-leg-structure 3 or at the base structure, respectively. Preferably, the adjustment cable 6 is a steel cable but it may also be realized in the form of textile cables, belts, chains or equivalent elements.

Due to the fixed anchoring of the cable ends at the sites 7 and 8 the adjustment cable 6 which is guided around two deviating rollers 9 and 10 essentially parallel to axis 4 forms a closed ring.

A continuous winch 11 which is perpendicular to axis 4 and which is fixedly mounted on rod 2 between the deviating rollers 9 and 10 moves the cable ring depending on the sense of rotation of the cable drum to the left or to the right or vice versa.

In this case the problem resides in that the distance 9-7 during rotation of the rods 2 will not be elongated and shortened, respectively, to the same extend as is the distance 8-10 on the opposite side. In the case of a conventional cylindrical cable drum this would be associated with stretching or loosening the adjustment cable.

In order to avoid this improper variation of the total length of the ring of the inventive adjustment cable the drum of the continuous winch 11 will be not formed cylindrically but with a coil diameter which is variable along the drum axis. The requirement of a constant total length of the ring of the adjustment cable 6 in in the horizontal swing of the rod 2 will be met by the fact that the different coil diameters for the adjustment cable to be wound and unwound, respectively, will compensate for the unequal variations of the sections 9-7 and each of 10-8.

In the figures a cable drum which meets this requirement is represented. It comprises cable grooves which are helically 12 arranged such that during rotation of the drum the sites whereupon the cable will tangentially be wound and unwound, respectively, will alter along the axis of the cable drum.

Figure 3:
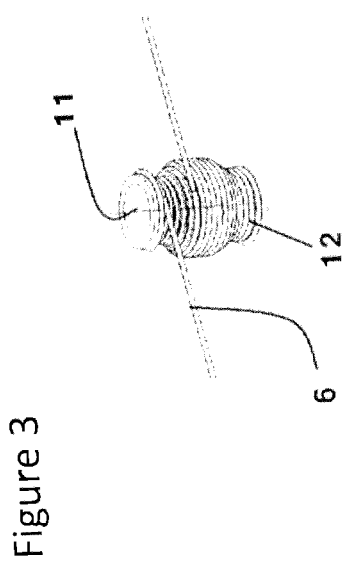
FIG. 3 shows a continuous winch with variable diameter.

Association of the coil diameter for the cable to be wound or unwound, respectively, to the respective lateral position of the cable windings according to the invention essentially corresponds to the convex form which will become more obvious from FIG. 3.

Basically it is possible to attaint entrainment of the adjustment cable from the drum only by friction, or the cable may be tied to the drum at a location where it cannot be lifted up, by way of a clamp which is not shown. However, it is also possible to disrupt the cable at the drum and to attach the ends of the cable by means of the clamps to the latter (FIG. 3, clamps not shown).

With attachment of the cable to the drum by way of clamps there is no need to pretension the respective cable branch.

Upon entrainment of the cable on the drum by way of friction, as shown, there is the need of pretension of the relieved part to avoid slippage. It is to be taken into account that stress and strain in the cable system in operation continually changes its direction depending on sense of rotation, wind forces, weight distribution. This pretension may be assured in a variety of ways, for example by way of a spring balancer or spring elements in the cable system.

A tensioning system which in cooperation with the cable drum 6 assures the required minimum tension no matter from which side the load will be initiated, is formed by a cable tensioning device.

In this case, according to the invention, the central one of the cable windings on the drum is drawn off by a tensioning roller which is adjustable by way of a spring off the drum.

The spring force is calculated such that pretension created therewith will be sufficient to produce non-slippage on the respective loaded side. The maximum cable force which is transmissible on the loaded side is many times higher than the cable tension generated in the spring. The ratio between these cable forces in order to exclude risk of slippage will arise, according to a known formula, from the number of windings and the coefficient of friction between the cable and the drum. An approach of increasing adherence of the cable to the drum is the provision of for example trapezoidal cable grooves (not shown).

Spring tension assures at least one minor pretension even in the non-loaded cable-branch and may furthermore compensate for shape defects of the drum to the extent that variations of length in the ring will completely be compensated if the drum is realized cylindrically.

Advantageously the continuous winch 11 has an axis which is connected to a drive 13 driving the winch 11 itself and preferably is controlled, depending on the sun, for maximum solar radiation of the photovoltaic module.

The invention claimed is:
1. A cable installation, comprising:
a support structure hinged to a base structure about a first axis,
wherein a rotatable deviation roller is provided at each end of the support structure,
wherein each of the rotatable deviation rollers is arranged with a continuous transmitting element that is fixed at one end to a first area of the base structure while another end of the continuous transmitting element is fixed to a second area of the base structure, and
wherein the continuous element is configured to be wound or unwound on a winch disposed between the deviating rollers.

2. The cable installation according to claim 1, wherein the support structure is a rod.

3. The cable installation according to claim 1, wherein the continuous transmitting element is a cable.

4. The cable installation according to claim 1, wherein the winch comprises a drum having a body tapering towards ends of the drum and having helical cable accommodating grooves.

5. The cable installation according to claim 1,
wherein a drum having helical cable accommodating grooves has a variable ratio between branches of the continuous transmitting element configured to be wound and unwound, respectively, on the winch, and
wherein a groove diameter for the continuous transmitting element is adapted in correspondence to a form condition arising in each position between the branch to be wound and the branch to be unwound of the continuous transmitting element.

6. The cable installation according to claim 1,
wherein the winch is a continuous winch formed as a drum winch,
wherein the continuous transmitting element comprises a cable winding configured to be drawn off the drum winch by a spring loaded tension roll, and
wherein a variation in overall length of the continuous transmitting element during adjustment is compensated or the cable installation has a pretension within defined limits, respectively.

7. The cable installation according to claim 1, wherein the continuous transmitting element comprises two parts, each part being fixed on the winch on an end of the part.

8. The cable installation according to claim 4,
wherein the drum is configured so as to achieve a variable ratio between the branches of the continuous transmitting element to be wound and unwound, respectively, on the drum,
wherein a groove diameter for the continuous transmitting element is adapted in correspondence to a form condition arising in each position between the branch to be wound and the branch to be unwound of the continuous transmitting element.

9. The cable installation according to claim 3,
wherein the winch is a continuous winch comprising a drum winch,
wherein a cable winding is drawn off the drum winch by a spring loaded tension roll, and
whereby variation in overall length of the cable during adjustment is compensated or cable installation has a pretension within defined limits, respectively.

* * * * *